United States Patent
Go et al.

(10) Patent No.: US 12,049,844 B2
(45) Date of Patent: Jul. 30, 2024

(54) MICRO-MIXER MODULE AND COMBUSTOR HAVING THE SAME

(71) Applicant: DOOSAN ENERBILITY CO., LTD, Changwon-si (KR)

(72) Inventors: Young Gun Go, Yongin (KR); Hyun Soo An, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/550,083

(22) Filed: Dec. 14, 2021

(65) Prior Publication Data
US 2022/0260254 A1 Aug. 18, 2022

(30) Foreign Application Priority Data
Feb. 17, 2021 (KR) .......................... 10-2021-0021071

(51) Int. Cl.
*F02C 3/20* (2006.01)
*F23R 3/28* (2006.01)

(52) U.S. Cl.
CPC .............. *F02C 3/20* (2013.01); *F23R 3/286* (2013.01)

(58) Field of Classification Search
CPC .............. F23R 3/286; F23R 3/34–346; F23R 2900/00014; F05D 2260/96; F05D 2260/963–964; F23D 14/58–586; F23D 14/62; F23D 14/64; F23D 14/70; F23D 14/82; F23D 2209/10; F23N 2231/28
See application file for complete search history.

(56) References Cited

U.S. PATENT DOCUMENTS

| | | | |
|---|---|---|---|
| 5,235,814 A * | 8/1993 | Leonard .................. | F23R 3/283 60/738 |
| 8,438,851 B1 * | 5/2013 | Uhm ....................... | F23R 3/286 60/737 |
| 8,683,804 B2 * | 4/2014 | Boardman .............. | F23R 3/286 60/737 |
| 8,955,327 B2 | 2/2015 | Barker | |
| 2011/0197587 A1 * | 8/2011 | Zuo ......................... | F23D 14/02 239/398 |

(Continued)

FOREIGN PATENT DOCUMENTS

JP 2010266185 A 11/2010
JP 2012149868 A 8/2012

(Continued)

OTHER PUBLICATIONS

KR Office Action, dated Jul. 26, 2022.
The KR Decision to Grant dated Oct. 20, 2022.

*Primary Examiner* — Jason H Duger
*Assistant Examiner* — Jingchen Liu
(74) *Attorney, Agent, or Firm* — Harvest IP Law, LLP

(57) ABSTRACT

A micro-mixer module and a combustor having the same are provided. The micro-mixer module includes a micro-mixer having an inlet portion formed on one side and through which a first fluid is introduced and a feed hole formed in a circumferential wall and through which a second fluid is fed, wherein the first fluid introduced through the inlet portion and the second fluid fed through the feed hole are mixed to form a fluid mixture which is injected into a combustion chamber, and an air hole formed at a side end of the combustor chamber of the micro-mixer.

17 Claims, 10 Drawing Sheets

(56) References Cited

U.S. PATENT DOCUMENTS

| | | | |
|---|---|---|---|
| 2013/0318977 A1* | 12/2013 | Berry | F23R 3/286 60/739 |
| 2014/0338338 A1* | 11/2014 | Chila | F23D 14/62 60/737 |
| 2014/0338339 A1* | 11/2014 | Westmoreland | F23R 3/286 60/737 |
| 2018/0372318 A1 | 12/2018 | Bolanos | |
| 2019/0212010 A1 | 7/2019 | Yoshino | |
| 2019/0360697 A1* | 11/2019 | Tada | F23D 14/62 |
| 2021/0102703 A1* | 4/2021 | Tada | F02C 7/22 |

FOREIGN PATENT DOCUMENTS

| | | | |
|---|---|---|---|
| JP | 2013160496 A | | 8/2013 |
| JP | 2014105886 A | * | 6/2014 |
| JP | 6030919 B2 | | 11/2016 |
| JP | 6050675 B2 | | 12/2016 |
| JP | 2017083160 A | | 5/2017 |
| JP | 2017096618 A | | 6/2017 |
| KR | 20150085748 A | | 7/2015 |
| KR | 101807586 B1 | | 1/2018 |
| KR | 20190040666 A | | 4/2019 |
| KR | 20190047522 A | | 5/2019 |
| KR | 1020200070362 A | | 6/2020 |

* cited by examiner

MICRO-MIXER MODULE AND COMBUSTOR HAVING THE SAME

CROSS REFERENCE TO RELATED APPLICATION

This application claims priority to Korean Patent Application No. 10-2021-0021071, filed on Feb. 17, 2021, the disclosure of which is incorporated herein by reference in its entirety.

BACKGROUND

1. Field

Apparatuses and methods consistent with exemplary embodiments relate to a micro-mixer module and a combustor having the same.

2. Description of the Related Art

A gas turbine is a combustion engine configured to mix and combust air compressed by a compressor and fuel and rotate a turbine with a high temperature gas generated by combustion. The gas turbine is used to drive a generator, an aircraft, a ship, a train, or the like.

The gas turbine includes a compressor, a combustor, and a turbine. The compressor serves to intake and compress external air and transfer the compressed air to the combustor. The air compressed by the compressor has a high temperature and a high pressure. The combustor serves to mix compressed air compressed by the compressor and fuel and combust the mixture of compressed air and fuel to produce combustion gas which is discharged to the turbine. A turbine blade in the turbine is rotated by the combusted gas to produce power. The generated power is used in various fields such as power generation and driving of a mechanical device.

SUMMARY

Aspects of one or more exemplary embodiments provide a micro-mixer module capable of stabilizing a flame normally at an outlet of a micro-mixer, and a combustor including the same.

Additional aspects will be set forth in part in the description which follows and, in part, will become apparent from the description, or may be learned by practice of the exemplary embodiments.

According to an aspect of an exemplary embodiment, there is provided a micro-mixer module including: a micro-mixer having an inlet portion formed on one side and through which a first fluid is introduced and a feed hole formed in a circumferential wall and through which a second fluid is fed, wherein the first fluid introduced through the inlet portion and the second fluid fed through the feed hole are mixed to form a fluid mixture which is injected into a combustion chamber; and an air hole formed at a side end of the combustor chamber of the micro-mixer.

The micro-mixer may include: an inlet flow path having the inlet portion formed on one side thereof and the feed hole formed in the circumferential wall and through which the fuel mixture flows; an outlet flow path formed at a position spaced apart from an imaginary extension line of the inlet flow path and injecting the fluid mixture into the combustion chamber; and an inclined flow path connecting the inlet flow path and the outlet flow path and formed inclined at a predetermined angle to reduce transfer of radiant heat by a flame generated in the combustion chamber to the inlet flow path.

The inlet flow path may have a first cross-sectional area, the outlet flow path may have a second cross-sectional area greater than the first cross-sectional area, and the inclined flow path may have a variable cross-sectional area that gradually increases from the inlet flow path to the outlet flow path.

The inclined flow path may include a first wall line forming a first angle with the imaginary extension line of the outlet flow path and a second wall line forming a second angle with the imaginary extension line of the outlet flow path, and the first angle and the second angle may be different from each other.

The first fluid may be a fuel including hydrogen, and the second fluid may be air.

The micro-mixer module may further include an air plenum formed to introduce air into a feed hole through a compressed air inlet hole and including an end plate formed at the side end of the combustor chamber, wherein an air hole may be formed in the end plate at a position corresponding to an outlet of the micro-mixer.

In an exemplary embodiment, the air hole may have a diameter larger than that of the outlet of the micro-mixer.

According to an aspect of another exemplary embodiment, there is provided a combustor including: a combustion chamber assembly including a combustion chamber in which a fuel fluid combusts; and a micro-mixer assembly including a plurality of micro-mixer modules to inject the fuel fluid into the combustion chamber, each of the micro-mixer module including: a micro-mixer having an inlet portion formed on one side and through which a first fluid is introduced and a feed hole formed in a circumferential wall and through which a second fluid is fed, wherein the first fluid introduced through the inlet portion and the second fluid fed through the feed hole are mixed to form a fluid mixture which is injected into the combustion chamber; and an air hole formed at a side end of the combustor chamber of the micro-mixer.

The micro-mixer may include: an inlet flow path having the inlet portion formed on one side thereof and the feed hole formed in the circumferential wall and through which the fuel mixture flows; an outlet flow path formed at a position spaced apart from an imaginary extension line of the inlet flow path and injecting the fluid mixture into the combustion chamber; and an inclined flow path connecting the inlet flow path and the outlet flow path and formed inclined at a predetermined angle to reduce transfer of radiant heat by a flame generated in the combustion chamber to the inlet flow path.

The inlet flow path may have a first cross-sectional area, the outlet flow path may have a second cross-sectional area greater than the first cross-sectional area, and the inclined flow path may have a variable cross-sectional area that gradually increases from the inlet flow path to the outlet flow path.

The inclined flow path may include a first wall line forming a first angle with the imaginary extension line of the outlet flow path and a second wall line forming a second angle with the imaginary extension line of the outlet flow path, and the first angle and the second angle may be different from each other.

The first fluid may be a fuel including hydrogen, and the second fluid may be air.

The combustor may further include an air plenum formed to introduce air into a feed hole through a compressed air inlet hole and including an end plate formed at the side end of the combustor chamber, wherein an air hole may be formed in the end plate at a position corresponding to an outlet of the micro-mixer.

The air hole may have a diameter larger than that of the outlet of the micro-mixer.

According to an aspect of another exemplary embodiment, there is provided a gas turbine including: a compressor configured to compress air, a combustor configured to mix the air compressed by the compressor with fuel to produce a fuel fluid and combust the fuel fluid, and a turbine generating power with combustion gas produced by the combustor. The combustor may include: a combustion chamber assembly including a combustion chamber in which fuel fluid is combusted; and a micro-mixer assembly including a plurality of micro-mixer modules to inject the fuel fluid to the combustion chamber. Each of the micro-mixer module may include a micro-mixer having an inlet portion formed on one side and through which a first fluid is introduced and a feed hole formed in a circumferential wall and through which a second fluid is fed, wherein the first fluid introduced through the inlet portion and the second fluid fed through the feed hole are mixed to form a fluid mixture which is injected into the combustion chamber, and an air hole formed at a side end of the combustor chamber of the micro-mixer.

The micro-mixer may include: an inlet flow path having the inlet portion formed on one side thereof and the feed hole formed in the circumferential wall and through which the fuel mixture flows; an outlet flow path formed at a position spaced apart from an imaginary extension line of the inlet flow path and injecting the fluid mixture into the combustion chamber; and an inclined flow path connecting the inlet flow path and the outlet flow path and formed inclined at a predetermined angle to reduce transfer of radiant heat by a flame generated in the combustion chamber to the inlet flow path.

The inlet flow path may have a first cross-sectional area, the outlet flow path may have a second cross-sectional area greater than the first cross-sectional area, and the inclined flow path may have a variable cross-sectional area that gradually increases from the inlet flow path to the outlet flow path.

The inclined flow path may include a first wall line forming a first angle with the imaginary extension line of the outlet flow path and a second wall line forming a second angle with the imaginary extension line of the outlet flow path, and the first angle and the second angle may be different from each other.

The first fluid may be a fuel including hydrogen, and the second fluid may be air.

The combustor may further include an air plenum formed to introduce air into a feed hole through a compressed air inlet hole and including an end plate formed at the side end of the combustor chamber, wherein an air hole may be formed in the end plate at a position corresponding to an outlet of the micro-mixer.

According to one or more exemplary embodiments, it is possible to prevent spontaneous ignition and flashback occurring in the micro-mixer by reducing the transfer of radiant heat from a flame generated in the combustion chamber into the micro-mixer. In addition, even when a swirling flow does not occur in the nozzle, a flame at the nozzle outlet is normally stabilized to improve the combustion efficiency.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
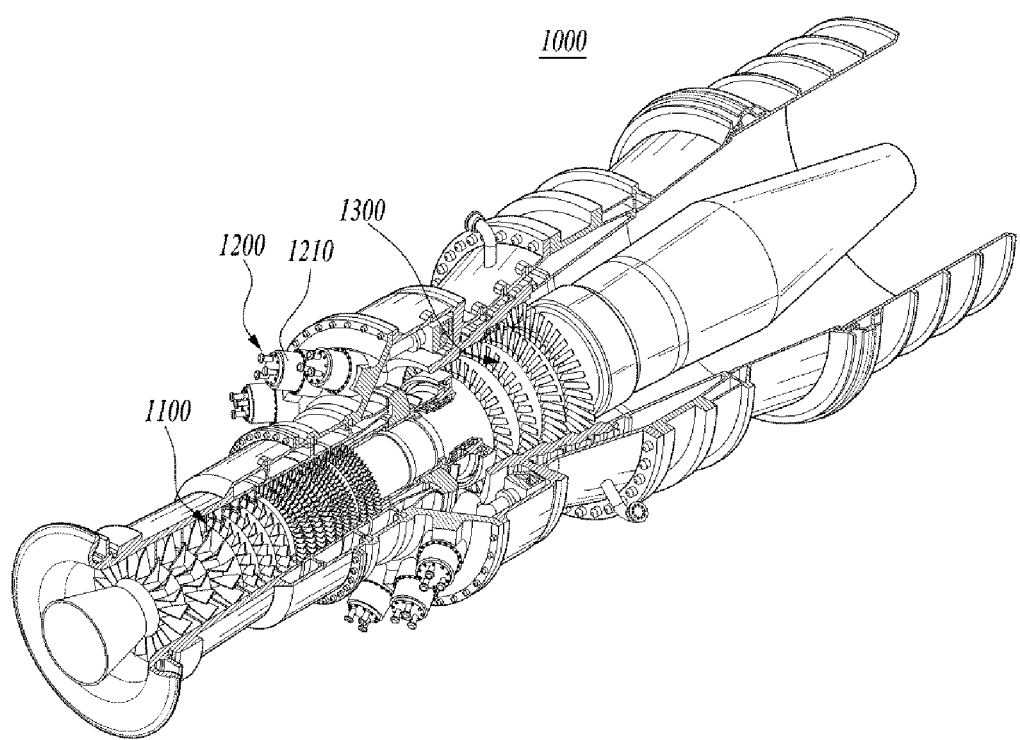
FIG. 1 is a view illustrating an interior of a gas turbine according to an exemplary embodiment.

Various modifications and various embodiments will be described in detail with reference to the accompanying drawings. However, it should be noted that the various embodiments are not for limiting the scope of the disclosure to the specific embodiment, but they should be interpreted to include all of modifications, equivalents or substitutions of the embodiments included within the spirit and scope disclosed herein.

Terms used herein are used to merely describe specific embodiments, and are not intended to limit the scope of the disclosure. As used herein, an element expressed in a singular form includes a plurality of elements, unless the context clearly indicates otherwise. Further, it will be understood that the term "includes" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, a micro-mixer module and a combustor including the same according to an exemplary embodiment will be described with reference to the accompanying drawings. It is noted that like reference numerals refer to like parts throughout the various figures and exemplary embodiments. In certain embodiments, a detailed description of known functions and configurations that may obscure the gist of the present disclosure will be omitted. For the same reason, some of the elements in the drawings are exaggerated, omitted, or schematically illustrated.

Figure 2:
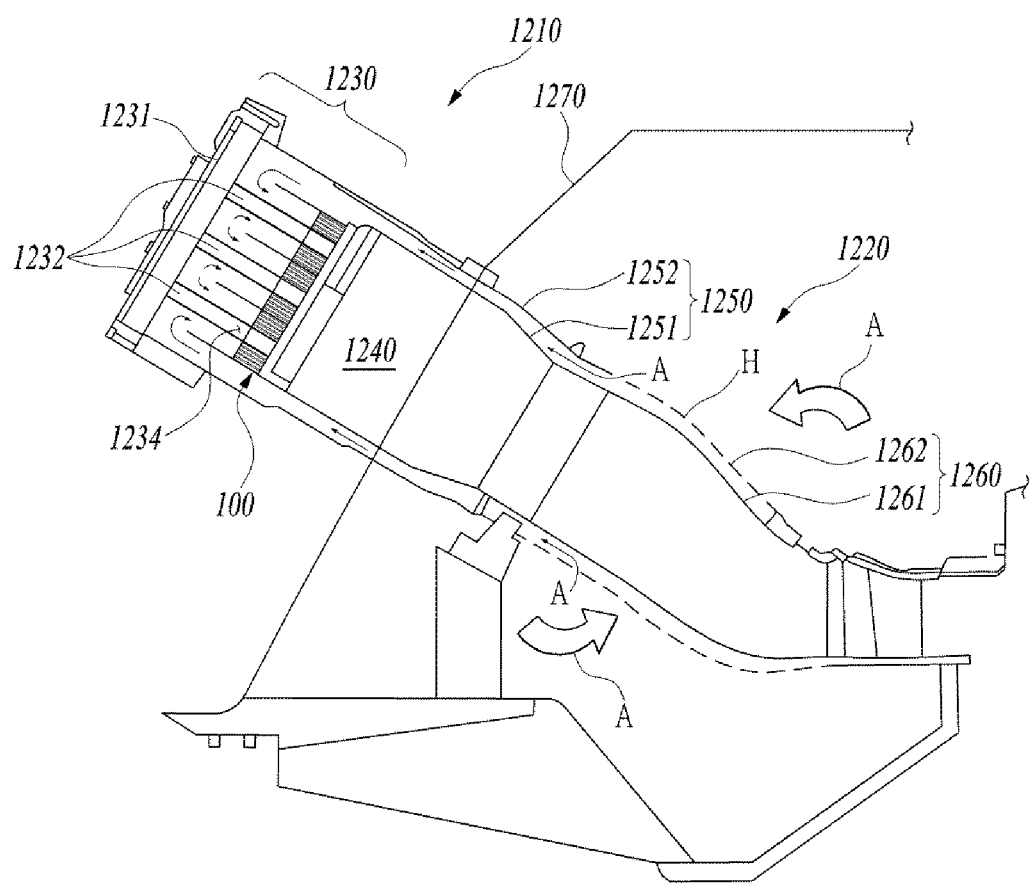
FIG. 2 is a view illustrating a burner module constituting a combustor in a gas turbine according to an exemplary embodiment.

FIG. 1 is a view illustrating an interior of a gas turbine according to an exemplary embodiment, and FIG. 2 is a view illustrating a burner module constituting a combustor in a gas turbine according to an exemplary embodiment.

Referring to FIGS. 1 and 2, a gas turbine 1000 includes a compressor 1100 that compresses incoming air to a high pressure, a combustor 1200 that mixes compressed air compressed by the compressor with fuel and combusts an air-fuel mixture, and a turbine 1300 that generates rotational force with combustion gas generated in the combustor. Here, upstream and downstream are defined based on a front and rear of the fuel or air flow.

An ideal thermodynamic cycle of a gas turbine may comply with the Brayton cycle. The Brayton cycle consists of four thermodynamic processes: isentropic compression (i.e., an adiabatic compression) process, isobaric combustion process, isentropic expansion (i.e., an adiabatic expansion) process and isobaric heat ejection process. That is, in the Brayton cycle, thermal energy may be released by combustion of fuel in an isobaric environment after atmospheric air is sucked and compressed into high pressure air, hot combustion gas may be expanded to be converted into kinetic energy, and exhaust gas with residual energy may be discharged to the outside. As such, the Brayton cycle consists of four thermodynamic processes including compression, heating, expansion, and heat ejection.

The gas turbine 1000 employing the Brayton cycle includes the compressor 1100, the combustor 1200, and the turbine 1300. Although the following description will be described with reference to FIG. 1, the present disclosure may be widely applied to other turbine engines having similar configurations to the gas turbine 1000 illustrated in FIG. 1.

Referring to FIG. 1, the compressor 1100 of the gas turbine may suck and compress air. The compressor 1100 may supply the compressed air to the combustor 1200 and also supply the cooling air to a high temperature region of the gas turbine that is required to be cooled. Because the sucked air is compressed in the compressor 1100 through an adiabatic compression process, the pressure and temperature of the air passing through the compressor 1100 increases.

The compressor 1100 may be designed in a form of a centrifugal compressor or an axial compressor, wherein the centrifugal compressor is applied to a small-scale gas turbine, whereas a multi-stage axial compressor is applied to a large-scale gas turbine 1000 illustrated in FIG. 1 to compress a large amount of air.

The compressor 1100 is driven using a portion of the power output from a turbine 1300. To this end, as illustrated in FIG. 1, a rotary shaft of the compressor 1100 and a rotary shaft of the turbine 1300 may be directly connected. In the case of the large-scale gas turbine 1000, almost half of the output produced by the turbine 1300 may be consumed to drive the compressor 1100. Accordingly, improving the efficiency of the compressor 1100 has a direct effect on improving the overall efficiency of the gas turbine 1000.

The combustor 1200 may mix the compressed air supplied from an outlet of the compressor 1100 with fuel and combust the mixture at constant pressure to produce combustion gas with high energy.

The combustor 1200 is disposed downstream of the compressor 1100, and includes a plurality of burner modules 1210 annularly disposed around a center axis thereof.

Referring to FIG. 2, the burner module 1210 may include a combustion chamber assembly 1220 having a combustion chamber 1240 in which a fuel fluid burns, and a micro-mixer assembly 1230 having a plurality of micro-mixers 100 for injecting the fuel fluid into the combustion chamber 1240. The fuel fluid may be supplied from a fuel tank in which fuel (e.g., hydrogen) is stored.

The gas turbine 1000 may use gas fuel including hydrogen and natural gas, liquid fuel, or a combination thereof. In order to create a combustion environment for reducing emissions such as carbon monoxides or nitrogen oxides, a gas turbine has a recent tendency to apply a premixed combustion scheme that is advantageous in reducing emissions through lowered combustion temperature and homogeneous combustion even though it is difficult to control the premixed combustion.

In case of premixed combustion, in the micro-mixer assembly 1230, the compressed air introduced from the compressor 1100 is mixed with fuel in advance, and then enters to the combustion chamber 1240. When the premixed gas is initially ignited by an ignitor and then a combustion state is stabilized, the combustion state is maintained by supplying fuel and air.

The micro-mixer assembly 1230 includes a plurality of micro-mixer modules MB in which a plurality of micro-mixers 100 for injecting a mixed fuel fluid are disposed. The micro-mixer 100 mixes fuel with air in an appropriate ratio to form a fuel-air mixture having conditions suitable for combustion.

The plurality of micro-mixer modules MB may include a single inner micro-mixer module and a plurality of circumferential micro-mixer modules radially arranged around the inner micro-mixer module.

The combustion chamber assembly 1220 includes the combustion chamber 1240 in which combustion occurs, a liner 1250 and a transition piece 1260.

The liner 1250 disposed on a downstream side of the micro-mixer assembly 1230 may have a dual structure of an inner liner part 1251 and an outer liner part 1252 in which the inner liner part 1251 is surrounded by the outer liner part 1252. In this case, the inner liner part 1251 is a hollow tubular member, and the combustion chamber 1240 is an internal space of the inner liner part 1251. The inner liner part 1251 is cooled by the compressed air introduced into an annular space inside the outer liner part 1252 through inlet holes H.

The transition piece 1260 is disposed on a downstream side of the liner 1250 to guide the combustion gas generated in the combustion chamber 1240 toward the turbine 1300. The transition piece 1260 may have a dual structure of an inner transition piece part 1261 and an outer transition piece part 1262 in which the inner transition piece part 1261 is surrounded by the outer transition piece part 1262. The inner transition piece part 1261 is also formed of a hollow tubular member such that a diameter gradually decreases from the liner 1250 toward the turbine 1300. In this case, the inner liner part 1251 and the inner transition piece part 1261 may be coupled to each other by a plate spring seal. Because respective ends of the inner liner part 1251 and the inner transition piece part 1261 are fixed to the combustor 1200 and the turbine 1300, respectively, the plate spring seal may have a structure capable of accommodating expansion of length and diameter by thermal expansion to support the inner liner part 1251 and the inner transition piece part 1261.

As such, the inner liner part 1251 and the inner transition piece part 1261 have a structure surrounded by the outer liner part 1252 and the outer transition piece part 1262, respectively so that compressed air may flow into the annular space between the inner liner part 1251 and the outer liner part 1252 and into the annular space between the inner transition piece part 1261 and the outer transition piece part 1262. The compressed air introduced into the annular spaces may cool the inner liner part 1251 and the inner transition piece part 1261.

In the meantime, high temperature and high pressure combustion gas generated by the combustor 1200 is supplied to the turbine 1300 through the liner 1250 and the transition piece 1260. In the turbine 1300, the combustion gas undergoes adiabatic expansion and impacts and drives a plurality of blades arranged radially around a rotary shaft of the turbine 1300 so that thermal energy of the combustion gas is converted into mechanical energy with which the rotary shaft rotates. A portion of the mechanical energy obtained from the turbine 1300 is supplied as the energy required to compress the air in the compressor 1100, and the remaining is utilized as an available energy to drive a generator to produce electric power The combustor 1200 may further include a casing 1270 and an end cover 1231 coupled together to receive the compressed air A flowing into the burner module 1210. After the compressed air A flows into the annular space inside the liner 1250 or the transition piece 1260 through the inlet holes H, the flow direction of the compressed air A is changed by the end cover 1231 to the inside of the micro-mixer 100. The fuel F may be supplied to the micro-mixer 100 via a fuel plenum 1234 through a fuel passage 1232 and may be mixed with compressed air.

Here, the fuel F is supplied in a state in which air A passes through the micro-mixer 100 to generate an air-fuel mixture FA. In this case, because the fuel F is supplied at a low speed in a state while the air A flows at a relatively high speed, there is a problem in that the fuel F and the air A are not sufficiently mixed.

Therefore, one or more exemplary embodiments provide a method for improving mixing efficiency by supplying air A at high speed while fuel F flows through the micro-mixer at a relatively low speed.

Figure 3:
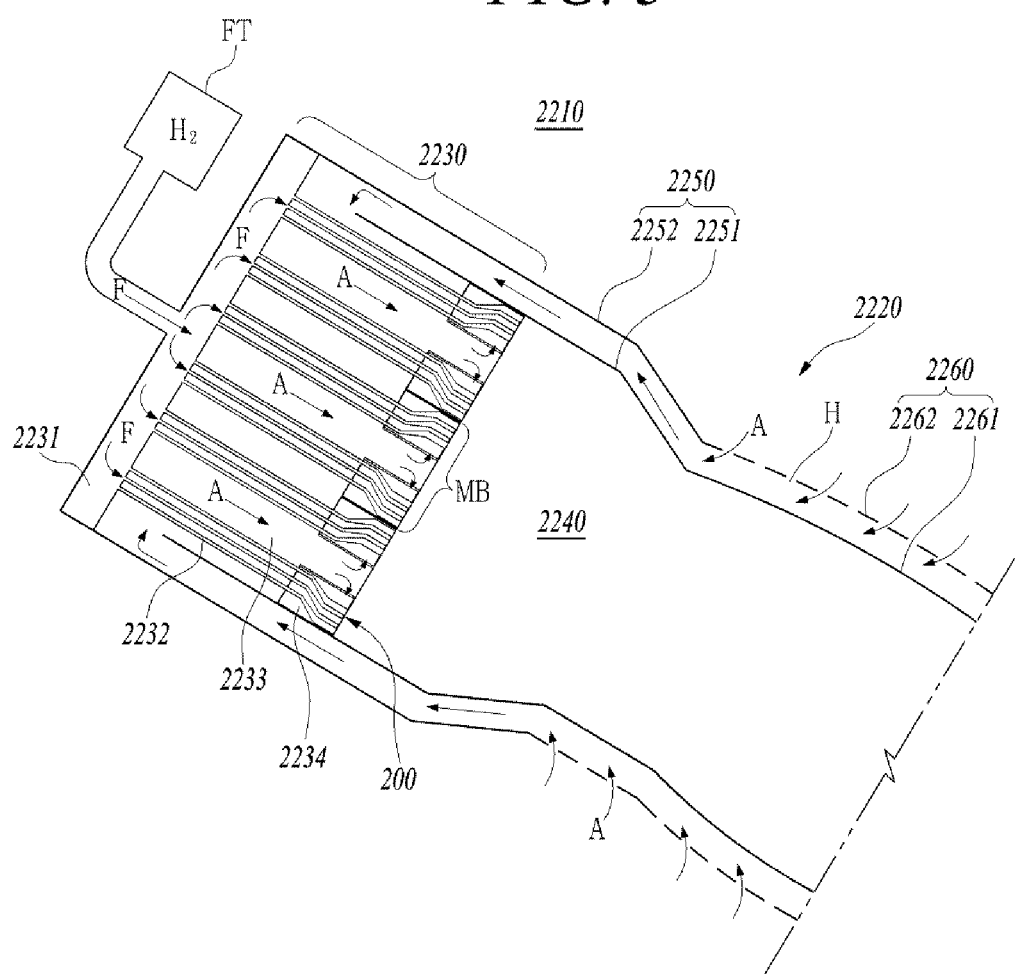
FIG. 3 is a view illustrating a burner module constituting a combustor according to an exemplary embodiment.
Figure 4:
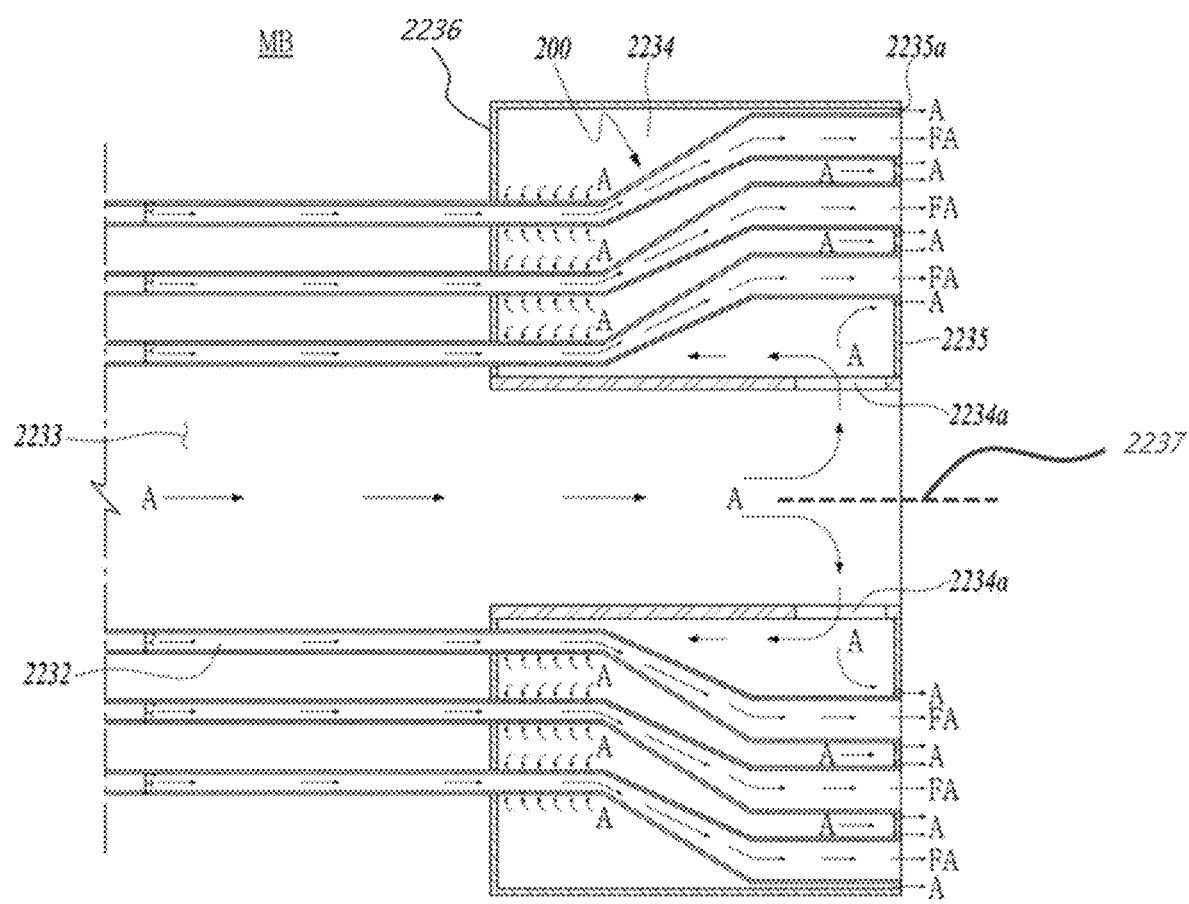
FIG. 4 is a side cross-sectional view illustrating a micro-mixer module according to an exemplary embodiment.

FIG. 3 is a view illustrating a burner module constituting a combustor according to an exemplary embodiment, and FIG. 4 is a side cross-sectional view illustrating a micro-mixer module according to an exemplary embodiment.

Referring to FIGS. 3 and 4, air A may be mixed in a state in which fuel F flows through a micro-mixer 200 in a burner module 2210.

The fuel F supplied from the fuel tank FT flows into the micro-mixer 200 via an end cover 2231 and a fuel passage 2232.

The compressed air A is introduced into an annular space of a liner 2250 or a transition piece 2260 through inlet holes H, and a flow direction thereof can be changed by the end cover 2231 to flow along an air flow space 2233, then flows into an air plenum 2234 through a plenum inlet 2234a, and then flows into the micro-mixer 200 through feed holes 212 to be mixed with fuel F. Reference numeral 2220 denotes a combustion chamber assembly, and reference numeral 2230 denotes a micro-mixer assembly.

Referring to FIG. 4, the micro-mixer module MB may include a micro-mixer 200 and an air hole 2235a formed at a side end of the combustor chamber 2240 of the micro-mixer 200. The micro-mixer module MB includes a plurality of micro-mixers 200 and is formed to extend in a radial direction with respect to an imaginary central axis of the air flow space 2233. The micro-mixer 200 is formed to extend in a flow direction of fluid (e.g., fuel or air).

Figure 5:
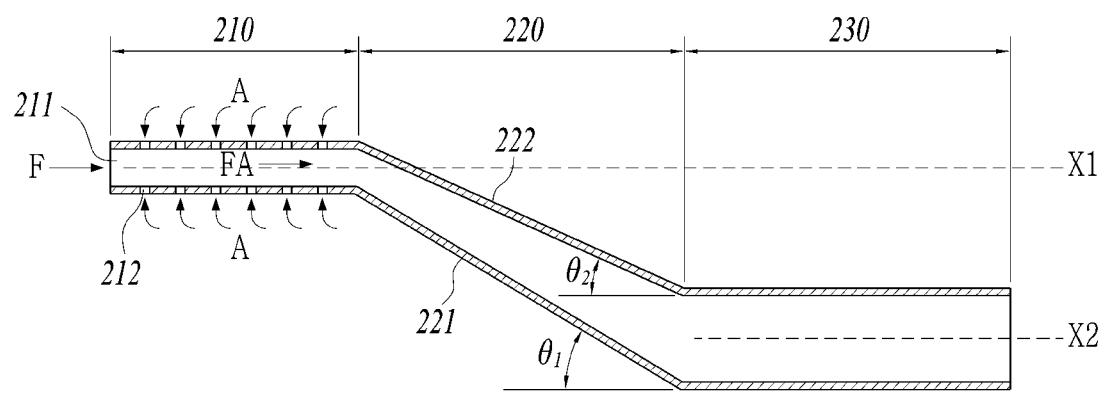
FIGS. 5 and 6 are side cross-sectional views illustrating a micro-mixer according to an exemplary embodiment.
Figure 6:
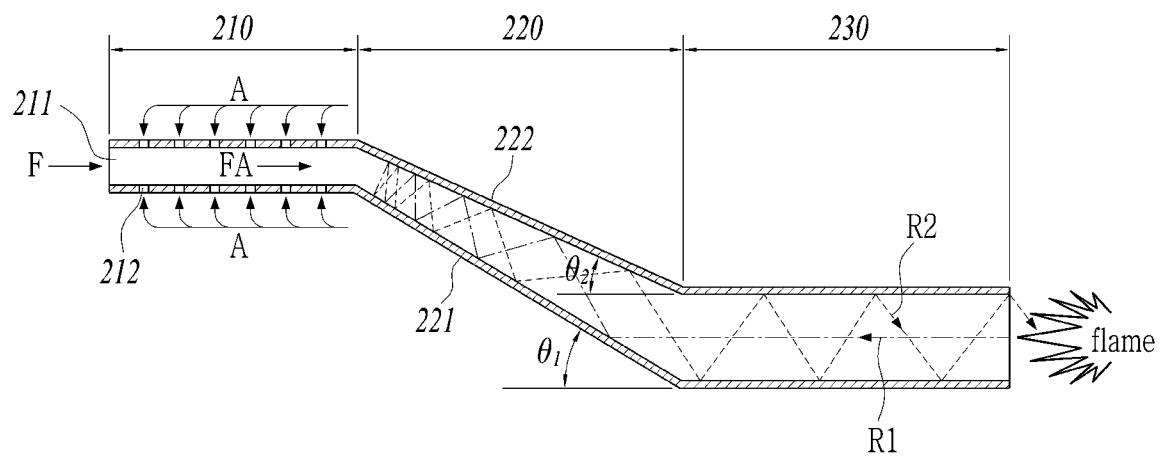

FIGS. 5 and 6 are side cross-sectional views illustrating a micro-mixer according to an exemplary embodiment.

Referring to FIGS. 5 and 6, the micro-mixer 200 is formed in a form of a tube in which a cross-sectional area thereof is gradually increased as a middle part thereof is inclined as opposed to a general straight tube form, to reduce transfer of radiant heat by a flame generated in the combustion chamber 2240 to the micro-mixer 200, thereby preventing spontaneous ignition and a flashback phenomenon occurring in the micro-mixer 200.

The micro-mixer 200 includes an inlet flow path 210, an inclined flow path 220, and an outlet flow path 230.

The inlet flow path 210 connected to the fuel flow path 2232 includes an inlet portion 211 formed on one end to flow the fuel F and feed holes 212 formed in a circumferential wall to supply the air A. The fuel F introduced through the inlet portion 211 and the air A fed through the feed holes 212 are mixed in the inlet flow path 210 to form an air-fuel mixture FA to flow into the inclined flow path 220.

The inclined flow path 220 connected to the other end of the inlet flow path 210 is inclined at a predetermined angle. The air-fuel mixture FA is injected into the combustion chamber 2240 along the inclined flow path 220 and the outlet flow path 230.

The outlet flow path 230 is formed to extend parallel to an imaginary extension line of the inlet flow path 210. That is, a flow axis (X1, a flow axis along a center line of the inlet flow path) of the air-fuel mixture FA flowing through the inlet flow path 210 and a flow axis X2 of the air-fuel mixture FA flowing through the outlet flow path 230 do not coincide with each other by the inclined flow path 220 and are spaced apart from each other in a predetermined distance and arranged in parallel. The imaginary extension line may be the flow axis of the air-fuel mixture FA.

The inclined flow path 220 is inclined at a predetermined angle to connect the inlet flow path 210 and the outlet flow path 230. The inclined flow path 220 connects the inlet flow path 210 and the outlet flow path 230 which are spaced apart from each other by a predetermined distance and is formed in a form of a tube in which the cross-sectional area is gradually increased from the inlet flow path 210 to the outlet flow path 230.

As a result, the inlet flow path 210 may have the smallest cross-sectional area and the outlet flow path 230 may have the largest cross-sectional area. That is, the inlet flow path 210 has a first cross-sectional area, the outlet flow path 230 has a second cross-sectional area larger than the first cross-sectional area, and the inclined flow path 220 has a variable cross-sectional area that is gradually increased from the inlet flow path 210 to the outlet flow path 230.

In addition, the inclined flow path 220 includes a first wall line 221 at a lower portion and a second wall line 222 at an upper portion. The first wall line 221 forms a first angle $\theta1$ with the imaginary extension line X2 of the outlet flow path 230, and the second wall line 222 forms a second angle $\theta2$ with the imaginary extension line X2 of the outlet flow path 230. Because the inclined flow path 220 has a variable cross-sectional area, the first angle $\theta1$ and the second angle $\theta2$ may be formed at different angles.

As illustrated in FIG. 5, if the inclined flow path 220 is inclined downward, the first angle $\theta1$ may be formed to be larger than the second angle $\theta2$. Alternatively, if the inclined flow path 220 is inclined upward as in the micro-mixer 200 formed in the upper air plenum 2234 in FIG. 4, the second angle $\theta2$ may be formed to be larger than the first angle $\theta1$.

The cross-sectional areas of the inlet flow path 210, the inclined flow path 220, and the outlet flow path 230 may have a polygonal shape.

Referring to FIG. 6, a partial radiant heat R1 transferred to the micro-mixer 200 through the outlet flow path 230 among radiant heat generated in the radial direction by a flame generated in the combustion chamber 2240 does not reach the region of the inlet flow path 210 in which the fuel F and air A are mixed, and the radiant heat R1 is discharged back to the combustion chamber 2240 through the outlet flow path 230 (radiant heat R2), because the radiant heat R1 is repeatedly reflected on an inner wall of the inclined flow path 220 gradually decreasing in diameter. Accordingly, it is possible to prevent spontaneous ignition and flashback phenomena caused by transfer of the radiant heat R1 to the region in which the fuel F and the air A are mixed.

In addition, the micro-mixer can improve the mixing efficiency by supplying air A at high speed in a state in which fuel F flows at a relatively low speed through the micro-mixer.

On the other hand, if a swirl flow does not occur as in the micro-mixer 200, the flame may not be normally stabilized at the nozzle outlet.

Figure 7:
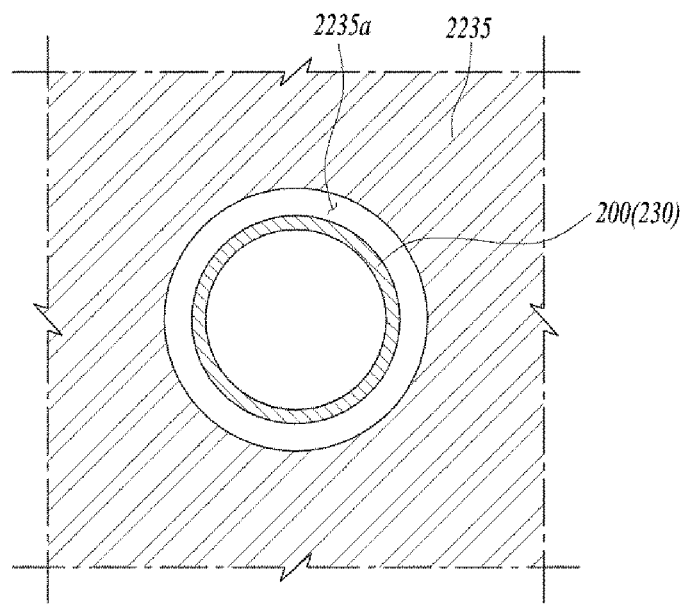
FIG. 7 is a view illustrating an end of a part of a micro-mixer module viewed from an upstream direction of a fluid flow according to an exemplary embodiment.

Accordingly, in an exemplary embodiment, an air hole 2235a is formed at the end of the micro-mixer 200 to improve combustion efficiency by normally stabilizing a flame at the outlet of the micro-mixer 200. FIG. 7 is a view illustrating an end of a part of a micro-mixer module viewed from an upstream direction of a fluid flow according to an exemplary embodiment.

Referring to FIGS. 4 and 7, the air hole 2235a is formed in an end plate 2235. The end plate 2235 constituting the air plenum 2234 is formed at an end of the air plenum 2234 on the combustion chamber 2240 side. An air hole 2235a having a size larger than a diameter (or cross-sectional area) of the outlet flow path 230 is formed in the end plate 2235 at a position corresponding to the outlet flow path 230 of the micro-mixer 200. The air hole 2235a is formed in a shape surrounding the outlet flow path 230.

A part of the air A introduced into the air plenum 2234 is supplied to the micro-mixer 200 through the feed holes 212 and mixed with the fuel F, and the other part of the introduced air A may be injected into the combustion chamber 2240 through the air hole 2235a.

Figure 8:
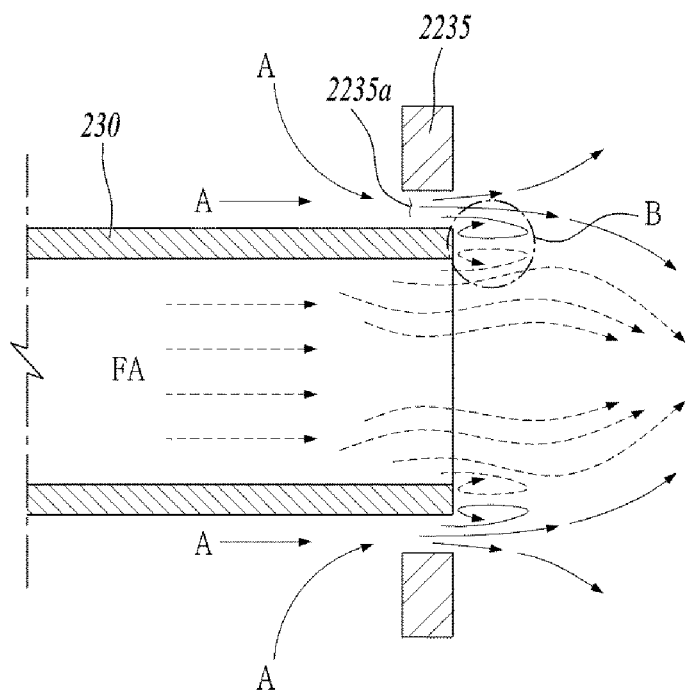
FIG. 8 is a cross-sectional view illustrating an operation state of a micro-mixer module according to an exemplary embodiment.

FIG. 8 is a cross-sectional view illustrating an operation state of a micro-mixer module according to an exemplary embodiment.

Referring to FIG. 8, the air A injected through the air hole 2235a flows into the combustion chamber 2240 while surrounding the air-fuel mixture FA injected through the outlet flow path 230. At this time, a part of the injected air A forms a small vortex in the end surface of the outlet flow path 230. In addition, a part of the injected air-fuel mixture FA also forms a small vortex in the end surface of the outlet flow path 230.

The vortex of the air A and the vortex of the air-fuel mixture FA stay in the end surface of the outlet flow path 230 while being trapped in a flow of the air A and the air-fuel mixture FA, and a flame is normally stabilized at the nozzle outlet, as indicated in an area B.

Accordingly, even when a swirling flow does not occur as in the micro-mixer 200 according to the exemplary embodiment, the flame may be normally stabilized at the nozzle outlet, thereby improving combustion efficiency.

Figure 9:
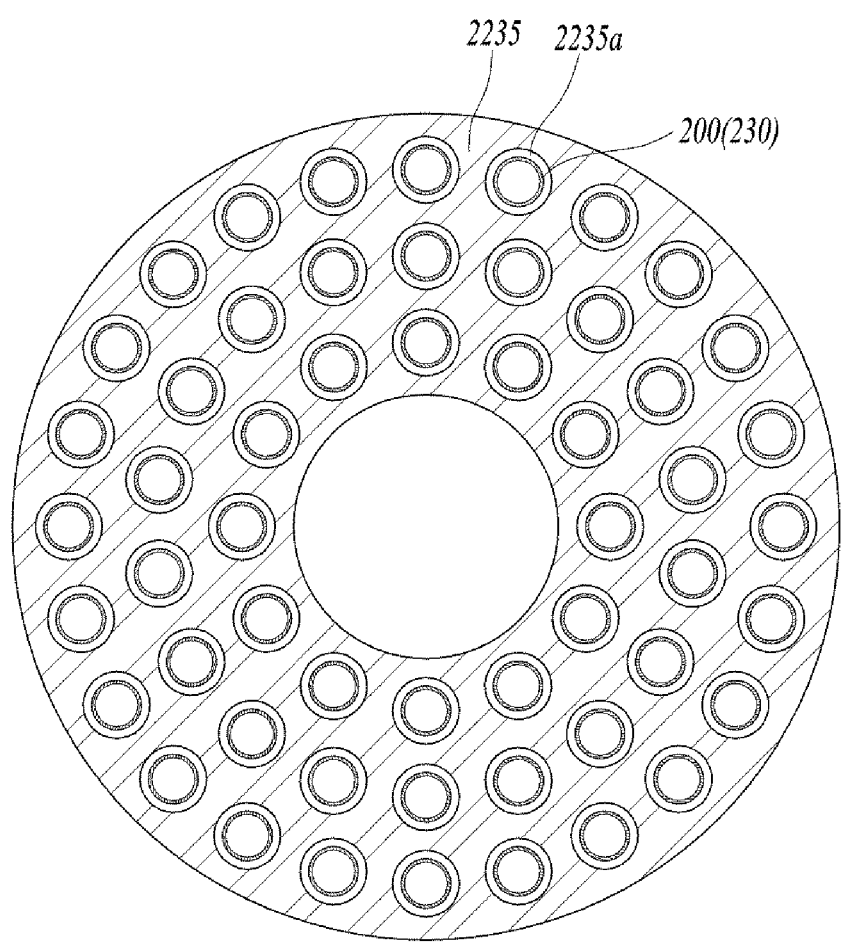
FIG. 9 is a view illustrating an end of a micro-mixer module viewed from an upstream direction of a fluid flow according to an exemplary embodiment.

FIG. 9 is a view illustrating an end of the micro-mixer module MB viewed from an upstream direction of a fluid flow according to an exemplary embodiment. Referring to FIG. 9, a plurality of micro-mixers 200 and a plurality of air holes 2235a are formed in a radial shape.

Figure 10A:
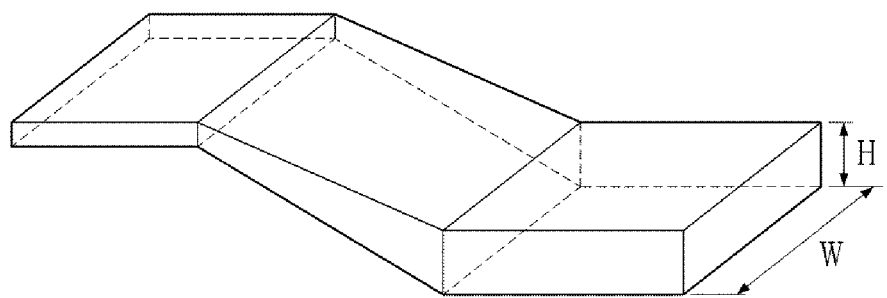
FIGS. 10A to 10C are perspective views illustrating various modifications of a micro-mixer according to an exemplary embodiment.
Figure 10B:
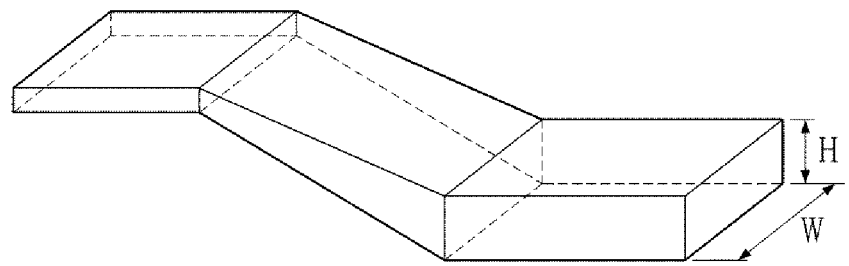
Figure 10C:
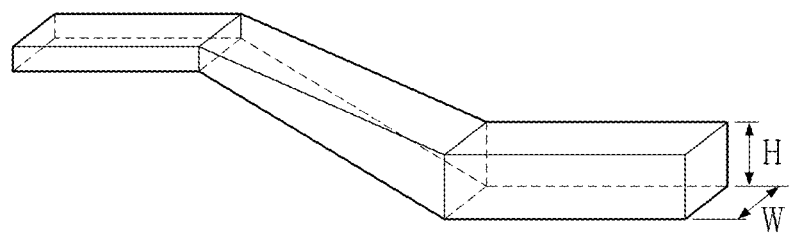
Figure 11A:
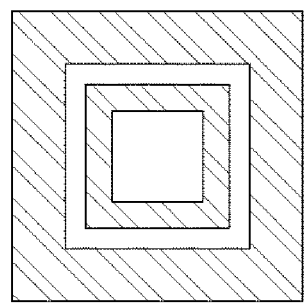
FIGS. 11A and 11B are views illustrating an end of a part of a micro-mixer module to which the micro-mixer of FIGS. 10A to 10C are applied viewed from an upstream direction of a fluid flow.
Figure 11B:
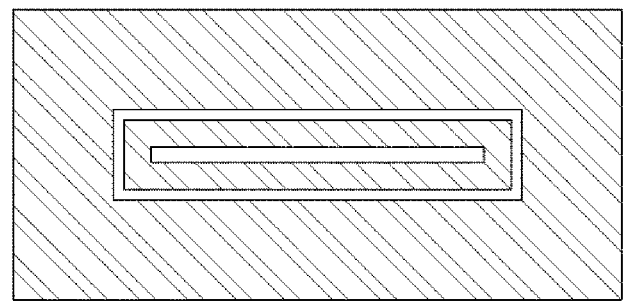

FIGS. 10A to 10C are perspective views illustrating various modifications of a micro-mixer according to an exemplary embodiment, and FIGS. 11A and 11B are views illustrating an end of a part of a micro-mixer module to which the micro-mixer of FIGS. 10A to 10C are applied as viewed in an upstream direction of a fluid flow.

The micro-mixer 200 is not limited to a circular tube shape as illustrated in FIG. 7, but may be formed in a polygonal tube shape as illustrated in FIGS. 10A to 10C and 11A and 11B, and a width W and height H of the micro-mixer 200 may also be formed in various ways.

While one or more exemplary embodiments have been described with reference to the accompanying drawings, it will be apparent to those skilled in the art that various modifications and variations can be made through addition, change, omission, or substitution of components without departing from the spirit and scope of the disclosure as set forth in the appended claims, and these modifications and changes fall within the spirit and scope of the disclosure as defined in the appended claims.

What is claimed is:

1. A micro-mixer module comprising:
a fuel flow path centered on and extending along a longitudinal axis, the fuel flow path configured to exclusively flow fuel;
a micro-mixer including:
an inlet flow path having a first axis parallel to the longitudinal axis,
an outlet flow path located downstream of the inlet flow path relative to the longitudinal axis and having a second axis parallel to the first axis,
the inlet flow path including an inlet and a feed hole, the inlet formed at an upstream end of the micro-mixer relative to the longitudinal axis and exclusively receiving the fuel from the fuel flow path, and the feed hole formed on a circumferential wall of the inlet flow path,
the outlet flow path including an outlet formed at a downstream end of the micro-mixer relative to the longitudinal axis,
an air plenum, in which the micro-mixer is contained, having a front plate connected to the upstream end of the micro-mixer and an end plate connected to the downstream end of the micro-mixer; and
an air hole formed on the end plate and having an annular shape surrounding the outlet of the outlet flow path,
wherein the air plenum contains air and is configured to introduce a first portion of the air to the inlet flow path through the feed hole and configured to introduce a second portion of the air to a combustion chamber through the air hole,
wherein the fuel received via the inlet and the first portion of the air introduced via the feed hole forms a fluid mixture in the inlet flow path, and the fluid mixture is discharged to the combustion chamber through the outlet of the outlet flow path,
wherein the micro-mixer further includes an inclined flow path obliquely connecting the inlet flow path at an upstream end of the inclined flow path and the outlet flow path at a downstream end of the inclined flow path, and the inclined flow path inclined from the inlet flow path toward a radial direction relative to the longitudinal axis,
wherein the inclined flow path has an inclined cross-section defined as a cross-section in a plane that includes and is parallel to the longitudinal axis, the inclined cross-section includes a first inclined line and a second inclined line disposed radially outward from the first inclined line relative to the longitudinal axis, wherein the first inclined line is inclined toward the radial direction at a first angle relative to the longitudinal axis and the second inclined line is inclined toward the same radial direction at a second angle relative to the longitudinal direction, and the first angle having a value that is different from the second angle, wherein the second axis of the outlet flow path is spaced radially outward from the first axis of the inlet flow path, and a diameter of the inclined flow path increases toward the downstream end of the inclined flow path relative to the longitudinal axis, such that a radiant heat generated at the combustion chamber and transferred into the outlet flow path is discharged back to the combustion chamber by repeatedly reflecting the radiant heat inside of the inclined flow path.

2. The micro-mixer module of claim 1, wherein the inlet flow path has a first cross-section defined as a cross-section in the plane that includes and is parallel to the longitudinal axis, the outlet flow path has a second cross-section defined as a cross-section in the plane that includes and is parallel to the longitudinal axis, and an area of the first cross-section is smaller than an area of the second cross-section;

wherein an area of the inclined cross-section is variable and gradually increases from the upstream end of the inclined flow path to the downstream end of the inclined flow path.

3. The micro-mixer module of claim 1, wherein the first angle is smaller than the second angle.

4. The micro-mixer module of claim 1, wherein the fuel includes hydrogen.

5. The micro-mixer module of claim 1, wherein a diameter of the air hole is larger than a diameter of the outlet of the outlet flow path.

6. The micro-mixer module of claim 1, wherein the air plenum has a plenum inlet formed on a side wall of the air plenum, the air contained in the air plenum is exclusively introduced into the air plenum through the plenum inlet, the plenum inlet formed adjacent to the end plate of the air plenum.

7. The micro-mixer module of claim 1, wherein a first diameter of the inlet flow path is constant toward the upstream end of the inclined flow path, and a second diameter of the outlet flow path is constant toward the outlet of the outlet flow path, the second diameter is larger than the first diameter.

8. The micro-mixer module of claim 1, wherein the inlet flow path and the outlet flow path do not overlap each other when viewed from the upstream end of the micro-mixer toward the downstream end of the micro-mixer.

9. A combustor comprising:
a combustion chamber assembly comprising a combustion chamber in which a fluid mixture combusts; and
a micro-mixer assembly comprising a plurality of micro-mixer modules to inject the fluid mixture into the combustion chamber, each of the plurality of micro-mixer modules comprising:
a fuel flow path centered on and extending along a longitudinal axis, the fuel flow path configured to exclusively flow fuel;
a micro-mixer including:
an inlet flow path having a first axis parallel to the longitudinal axis,
an outlet flow path located downstream of the inlet flow path relative to the longitudinal axis and having a second axis parallel to the first axis,
the inlet flow path including an inlet and a feed hole, the inlet formed at an upstream end of the micro-mixer relative to the longitudinal axis and exclusively receiving the fuel from the fuel flow path, and the feed hole formed on a circumferential wall of the inlet flow path,
the outlet flow path including an outlet formed at a downstream end of the micro-mixer relative to the longitudinal axis,
an air plenum, in which the micro-mixer is contained, having a front plate connected to the upstream end of the micro-mixer and an end plate connected to the downstream end of the micro-mixer; and
an air hole formed on the end plate and having an annular shape surrounding the outlet of the outlet flow path, wherein, for each of the plurality of micro-mixer modules, the air plenum contains air and is configured to introduce a first portion of the air to the inlet flow path through the feed hole and configured to introduce a second portion of the air to the combustion chamber through the air hole, wherein, for each of the plurality of micro-mixer modules, the fuel received via the inlet and the first portion of the air introduced via the feed hole forms the fluid mixture in the inlet flow path, and the fluid mixture is discharged to the combustion chamber through the outlet of the outlet flow path, wherein, for each of the plurality of micro-mixer modules, the micro-mixer further includes an inclined flow path obliquely connecting the inlet flow path at an upstream end of the inclined flow path and the outlet flow path at a downstream end of the inclined flow path, and the inclined flow path inclined from the inlet flow path toward a radial direction relative to the longitudinal axis, wherein, for each of the plurality of micro-mixer modules, the inclined flow path has an inclined cross-section defined as a cross-section in a plane that includes and is parallel to the longitudinal axis, the inclined cross-section includes a first inclined line and a second inclined line disposed radially outward from the first inclined line relative to the longitudinal axis, wherein, for each of the plurality of micro-mixer modules, the first inclined line is inclined toward the radial direction at a first angle relative to the longitudinal axis and the second inclined line is inclined toward the same radial direction at a second angle relative to the longitudinal direction, and the first angle having a value that is different from the second angle, wherein, for each of the plurality of micro-mixer modules, the second axis of the outlet flow path is spaced radially outward from the first axis of the inlet flow path, and a diameter of the inclined flow path increases toward the downstream end of the inclined flow path, such that a radiant heat generated at the combustion chamber and transferred into the outlet flow path is discharged back to the combustion chamber by repeatedly reflecting the radiant heat inside of the inclined flow path.

10. The combustor of claim 9, wherein, for each of the plurality of micro-mixer modules, the inlet flow path has a first cross-section defined as a cross-section in the plane that includes and is parallel to the longitudinal axis, the outlet flow path has a second cross-section defined as a cross-section in the plane that includes and is parallel to the longitudinal axis, and an area of the first cross-section is smaller than an area of the second cross-section;

wherein, for each of the plurality of micro-mixer modules, an area of the inclined cross-section is variable and gradually increases from the upstream end of the inclined flow path to the downstream end of the inclined flow path.

11. The combustor of claim 9, wherein, for each of the plurality of micro-mixer modules, the first angle is smaller than the second angle.

12. The micro-mixer module of claim 1, wherein the fuel includes hydrogen.

13. The combustor of claim 9, wherein, for each of the plurality of micro-mixer modules, a diameter of the air hole is larger than a diameter of the outlet of the outlet flow path.

14. A gas turbine comprising:
a compressor, a combustor configured to combust a fluid mixture, and a turbine generating power with combustion gas produced by the combustor,
wherein the combustor comprises:
a combustion chamber assembly including a combustion chamber in which the fluid mixture combusts; and
a micro-mixer assembly including a plurality of micro-mixer modules to inject the fluid mixture into the combustion chamber, each of the plurality of micro-mixer modules comprising:
a fuel flow path centered on and extending along a longitudinal axis, the fuel flow path configured to exclusively flow fuel;
a micro-mixer including:
an inlet flow path having a first axis parallel to the longitudinal axis,
an outlet flow path located downstream of the inlet flow path relative to the longitudinal axis and having a second axis parallel to the first axis,
the inlet flow path including an inlet and a feed hole, the inlet formed at an upstream end of the micro-mixer relative to the longitudinal axis and exclusively receiving the fuel from the fuel flow path, and the feed hole formed on a circumferential wall of the inlet flow path,
the outlet flow path including an outlet formed at a downstream end of the micro-mixer relative to the longitudinal axis,
an air plenum, in which the micro-mixer is contained, having a front plate connected to the upstream end of the micro-mixer and an end plate connected to the downstream end of the micro-mixer; and
an air hole formed on the end plate and having an annular shape surrounding the outlet of the outlet flow path,
wherein, for each of the plurality of micro-mixer modules, the air plenum contains air and is configured to introduce a first portion of the air to the inlet flow path through the feed hole and configured to introduce a second portion of the air to the combustion chamber through the air hole,
wherein, for each of the plurality of micro-mixer modules, the fuel received via the inlet and the first portion of the air introduced via the feed hole forms the fluid mixture in the inlet flow path, and the fluid mixture is discharged to the combustion chamber through the outlet of the outlet flow path,
wherein, for each of the plurality of micro-mixer modules, the micro-mixer further includes an inclined flow path obliquely connecting the inlet flow path at an upstream end of the inclined flow path and the outlet flow path at a downstream end of the inclined flow path, and the inclined flow path inclined from the inlet flow path toward a radial direction relative to the longitudinal axis,
wherein, for each of the plurality of micro-mixer modules, the inclined flow path has an inclined cross-section defined as a cross-section in a plane that includes and is parallel to the longitudinal axis, the inclined cross-section includes a first inclined line and a second inclined line disposed radially outward from the first inclined line relative to the longitudinal axis,
wherein, for each of the plurality of micro-mixer modules, the first inclined line is inclined toward the radial direction at a first angle relative to the longitudinal axis and the second inclined line is inclined toward the same radial direction at a second angle relative to the longitudinal direction, and the first angle having a value that is different from the second angle,
wherein, for each of the plurality of micro-mixer modules, the second axis of the outlet flow path is spaced radially outward from the first axis of the inlet flow path, and a diameter of the inclined flow path increases toward the downstream end of the inclined flow path, such that a radiant heat generated at the combustion chamber and transferred into the outlet flow path is discharged back to the combustion chamber by repeatedly reflecting the radiant heat inside of the inclined flow path.

15. The gas turbine of claim 14, wherein, for each of the plurality of micro-mixer modules, the inlet flow path has a first cross-section defined as a cross-section in the plane that includes and is parallel to the longitudinal axis, the outlet flow path has a second cross-section defined as a cross-section in the plane that includes and is parallel to the longitudinal axis, and an area of the first cross-section is smaller than an area of the second cross-section;
wherein, for each of the plurality of micro-mixer modules, an area of the inclined cross-section is variable and gradually increases from the upstream end of the inclined flow path to the downstream end of the inclined flow path.

16. The gas turbine of claim 14, wherein, for each of the plurality of micro-mixer modules, the first angle is smaller than the second angle.

17. The gas turbine of claim 14, wherein the fuel includes hydrogen.

* * * * *